US006889490B2

(12) United States Patent
Hornung

(10) Patent No.: US 6,889,490 B2
(45) Date of Patent: May 10, 2005

(54) AIR INDUCTION SYSTEM

(75) Inventor: Stefan Hornung, Medina, OH (US)

(73) Assignee: MTD Products Inc, Valley City, OH (US)

(*) Notice: Subject to any disclaimer, the term of this patent is extended or adjusted under 35 U.S.C. 154(b) by 10 days.

(21) Appl. No.: 10/304,604

(22) Filed: Nov. 26, 2002

(65) Prior Publication Data

US 2003/0115847 A1 Jun. 26, 2003

Related U.S. Application Data

(63) Continuation-in-part of application No. 09/866,345, filed on May 25, 2001, now Pat. No. 6,684,616, which is a continuation-in-part of application No. 09/410,784, filed on Oct. 1, 1999, now abandoned.

(51) Int. Cl.[7] .......................... A01D 34/03; A01D 34/43; A01D 34/64

(52) U.S. Cl. .......................................................... 56/16.7

(58) Field of Search .......................... 56/16.7; 180/68.3, 180/68.1, 68.2, 69.2; D15/15, 14, 17, 31

(56) References Cited

U.S. PATENT DOCUMENTS

| | | | | | |
|---|---|---|---|---|---|
| D106,088 | S | * | 9/1937 | Morgan | D15/31 |
| 3,796,277 | A | | 3/1974 | Gordon | |
| 3,896,872 | A | | 7/1975 | Pabst et al. | |
| 3,982,600 | A | | 9/1976 | Gerresheim et al. | |
| 3,987,766 | A | | 10/1976 | Welck | |
| D248,397 | S | * | 7/1978 | Cognata et al. | D15/15 |
| 4,211,058 | A | | 7/1980 | Larsen | |
| 4,231,344 | A | | 11/1980 | Urbinati et al. | |
| 4,354,458 | A | | 10/1982 | Bury | |
| 4,573,544 | A | | 3/1986 | Hoch et al. | |
| 4,606,422 | A | | 8/1986 | Jewett | |
| 4,646,864 | A | | 3/1987 | Racchi | |
| D297,538 | S | * | 9/1988 | Ogasawara et al. | D15/15 |
| 4,819,550 | A | | 4/1989 | Ioka | |
| 4,886,135 | A | | 12/1989 | Nakamura et al. | |
| D310,374 | S | * | 9/1990 | Westimayer et al. | D15/15 |
| 4,969,533 | A | | 11/1990 | Holm et al. | |
| 5,022,479 | A | | 6/1991 | Kiser et al. | |
| 5,113,819 | A | | 5/1992 | Murakawa et al. | |
| 5,193,636 | A | * | 3/1993 | Holm | 180/68.1 |
| 5,207,187 | A | | 5/1993 | Kurohara et al. | |
| D371,372 | S | * | 7/1996 | Westimayer et al. | D15/31 |
| 5,618,323 | A | * | 4/1997 | Shearn et al. | 55/385.3 |
| D383,470 | S | * | 9/1997 | Westimayer et al. | D15/31 |
| 5,678,648 | A | | 10/1997 | Imanishi et al. | |
| 5,782,312 | A | | 7/1998 | Murakawa | |
| D397,121 | S | | 8/1998 | Smith | |
| 5,794,733 | A | * | 8/1998 | Stosel et al. | 180/68.1 |
| 5,947,219 | A | | 9/1999 | Peter et al. | |
| 6,056,075 | A | | 5/2000 | Kargilis | |
| D447,153 | S | * | 8/2001 | Hornung | D15/17 |
| 6,484,835 | B1 | * | 11/2002 | Krapfl et al. | 180/68.3 |
| D473,882 | S | * | 4/2003 | Kuwae | D15/31 |
| D474,206 | S | * | 5/2003 | Kuwae | D15/31 |

FOREIGN PATENT DOCUMENTS

| | | |
|---|---|---|
| FR | 1156039 | 5/1958 |

* cited by examiner

*Primary Examiner*—Árpád F+e Kovács
(74) *Attorney, Agent, or Firm*—Wegman, Hessler & Vanderburg

(57) ABSTRACT

A hood and a blower housing form an air induction cavity in the side of the mower hood, which draws the ambient air into the air intake aperture and from there into the engine. Two shield members on the blower housing prevent the ambient air from mixing with the hot air of the engine. A method of air induction including the steps of forming an air induction cavity by connecting the upper hood to the housing, having the lower lip of the air induction cavity lower than the air intake of the blower housing, channeling the air into the air intake, and preventing the hot air of the engine from mixing with the ambient air drawn through the air induction cavity.

27 Claims, 9 Drawing Sheets

AIR INDUCTION SYSTEM

This application is a continuation-in-part of Ser. No. 09/866,345, filed May 25, 2001, now U.S. Pat. No. 6,684,616 which is incorporated herein by reference, which claims priority, from a U.S. utility continuation-in-part application having Ser. No. 09/410,784, filed on Oct. 1, 1999 now abandoned.

BACKGROUND OF THE INVENTION

I. Field of the Invention

This invention relates to the field of lawn mowers, in more particularly to the air induction system of the mower hood of a riding lawn mower.

II. Description of the Related Art

It is well known in the art to provide ventilation in the hood of a riding lawn mower in order to cool the engine. Also, the air pulled in through the hood is used in mixing oxygen with the gasoline to create combustible conditions to provide power in the engine. However, most of the prior art mowers have the ventilation slits in the top of the mower hood. This allows rain and other debris to enter the mower engine, causing problems of rust and dampness.

One type of riding lawn mower is disclosed in U.S. Pat. No. 4,969,533 to Holm et al. Holm discloses a tractor including a dual screen filtering arrangement located upstream of a radiator and an engine combustion air inlet. Although the Holm patent discloses the use of air inlets on the side of the mower hood, it does not disclose the creation of air induction cavities solely by connecting an upper hood and a lower hood. The present invention also does away with the need for screens to prevent debris from entering the engine.

One type of riding lawn mower is disclosed in U.S. Pat. No. 5,782,312 to Murakawa. Murakawa discloses slits formed in a front surface of a panel body on the left and right sides for drawing in engine cooling air. These slits are provided particularly to guide the cooling air forwardly and downwardly. In the current invention however the slit for drawing in the air is aligned along the side of the mower hood, as opposed to the panel body near the steering wheel as in Murakawa. The length of the air induction cavity in the current invention also allows a good volume of air to be drawn into the engine. The Murakawa patent also does not disclose any method for separating the hot and cold air underneath the hood, and does not have the inventive blower housing as described in the current invention. The current invention therefore provides advantages over the cooling capabilities of the Murakawa invention.

Another riding mower is disclosed in U.S. Pat. No. 5,113,819 to Murakawa et al. Murakawa discloses air guide covers that, together with the surface of the engine body, define a cooling air passage that allows the oil cooler to be supplied with cooling air that has not been heated by the engine. However, this separation of the hot and cold air takes place within the engine, as opposed to underneath the hood, and separate from the engine as in the current invention. The current invention also draws the air into the engine through air induction cavities that are located lower than the air intake, thereby preventing debris from entering the engine.

Another riding lawn mower is described in U.S. Pat. No. 5,207,187 to Kurohara et al. Kurohara discloses two shield members connected to opposite ends of each other and extending downwardly between the sidewalls of the engine and the side surface of the hood respectively. This shield allows the cooling air to be introduced from the rear of the engine and to flow along opposite sides of the engine to reach an air suction opening above the engine. However, these shield members do not separate the hot and the cold air from going into the engine, and also the air drawn in, in Kurohara, comes from the back of the mower hood or the front of the panel body underneath the steering column.

The present invention contemplates a new and improved air induction system, which is simple in design, effective in use, and overcomes the foregoing difficulties and others while providing better and more advantageous overall results.

SUMMARY OF THE INVENTION

In accordance with the present invention, a new and improved air induction system is provided which has an engine, a base, a hood for enclosing the engine, the hood comprising an upper hood, a lower hood, a first air induction cavity on a first side of the hood, a second air induction cavity on a second side of the hood, the air induction cavities having a first opening and a second opening, wherein the first opening is substantially larger than the second opening, a headlight, bellows for adjustably attaching the blower housing to the engine, and a blower housing, the blower housing comprising a first shield member, a second shield member, an air intake, a first lip and a second lip, the lips being angled upwardly toward the blower housing, the lips having an angle A1, the angle A1 being approximately between 60° and 80°, a first channel, and a second channel, the induction cavities being formed by the connection of the upper hood to the blower housing.

In accordance with another aspect of the present invention, the air induction system has an upper hood, a lower hood, a blower housing, an air induction cavity, the air induction cavity being formed by the connection of the upper hood to the blower housing, and an air intake.

In accordance with yet another aspect of the present invention, the air induction system includes the upper hood having a top that is a continuous piece, the air induction cavity being located on a side of the upper hood, the housing assembly having at least two air induction cavities, upper and lower lips, the upper and lower lips forming the air induction cavity, and an air intake.

In accordance with still another aspect of the present invention, the air induction system includes the air intake having a height, the lower lip having a height, the height of the air intake being greater than the height of the lower lip, the air induction cavity having a first opening and a second opening, the first opening being greater than the second opening, a first shield member, a second shield member, the shield members separating the air from an engine from the ambient air, an air intake, and the blower housing fitting inside the upper hood.

In accordance with yet another aspect of the present invention, the air induction cavities have a width and a height, the width being greater than the height.

In accordance with another aspect of the present invention, a method of air induction includes the steps of providing an upper hood, providing an air intake, providing a blower housing, connecting the upper hood to the blower housing, thereby creating an air induction cavity, drawing air into the blower housing through the air induction cavity, channeling the air into the air intake in the blower housing, and preventing hot air from the associated engine from mixing with the air being drawn into the air intake, the mixing being prevented by first and second shield members.

In accordance with still another aspect of the present invention, the method includes the steps of providing an upper hood with an upper lip, providing a blower housing with a lower lip, the lower lip having a height and the air intake having a height, the height of the air intake being greater than the height of the lower lip, providing an air induction cavity having a first opening and a second opening, the first opening being greater than the second opening.

One advantage of the current invention is that rainwater is prevented from entering the engine because the air is drawn in from the side of the mower hood.

Another advantage of the current invention is that the hot air is prevented from going into the air intake, and only ambient air is used.

Still another advantage of the current invention is that the air induction cavity is formed by the connection of the upper hood and the blower housing.

Yet another advantage of the current invention is that the ambient air is drawn in from the sides of the hood, thereby preventing debris from entering the engine.

Still other benefits and advantages of the invention will become apparent to those skilled in the art upon a reading and understanding of the following detailed specification.

BRIEF DESCRIPTION OF THE DRAWINGS

The invention may take physical form in certain parts and arrangement of parts. A preferred embodiment of these parts will be described in detail in the specification and illustrated in the accompanying drawings, which form a part of this disclosure and wherein.

DESCRIPTION OF THE PREFERRED EMBODIMENT

Figure 3:
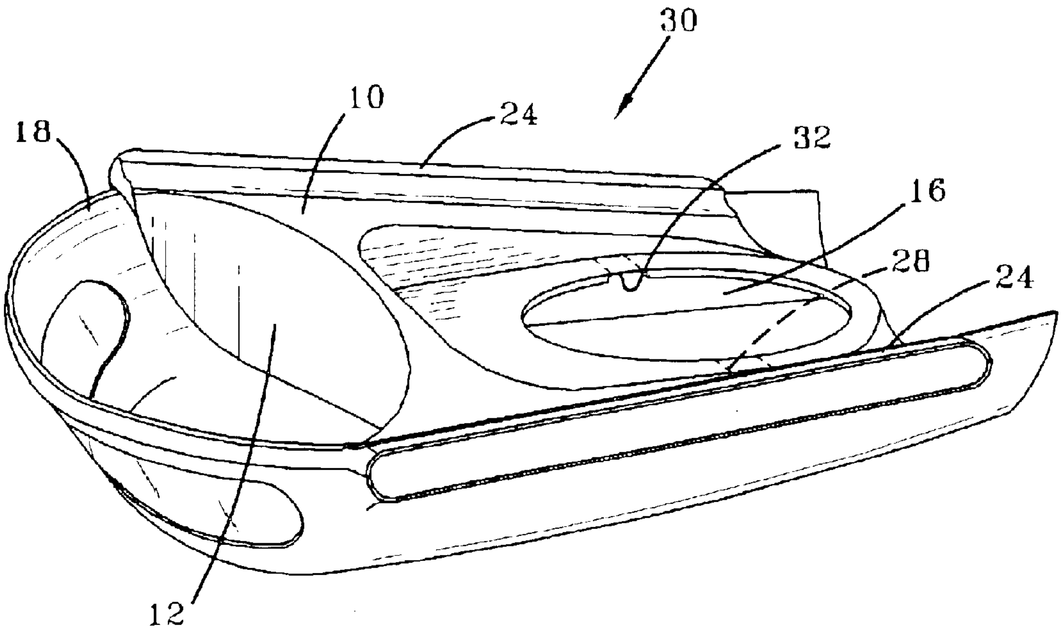
FIG. 3 is a perspective view of the inventive hood/blower assembly.
Figure 5:
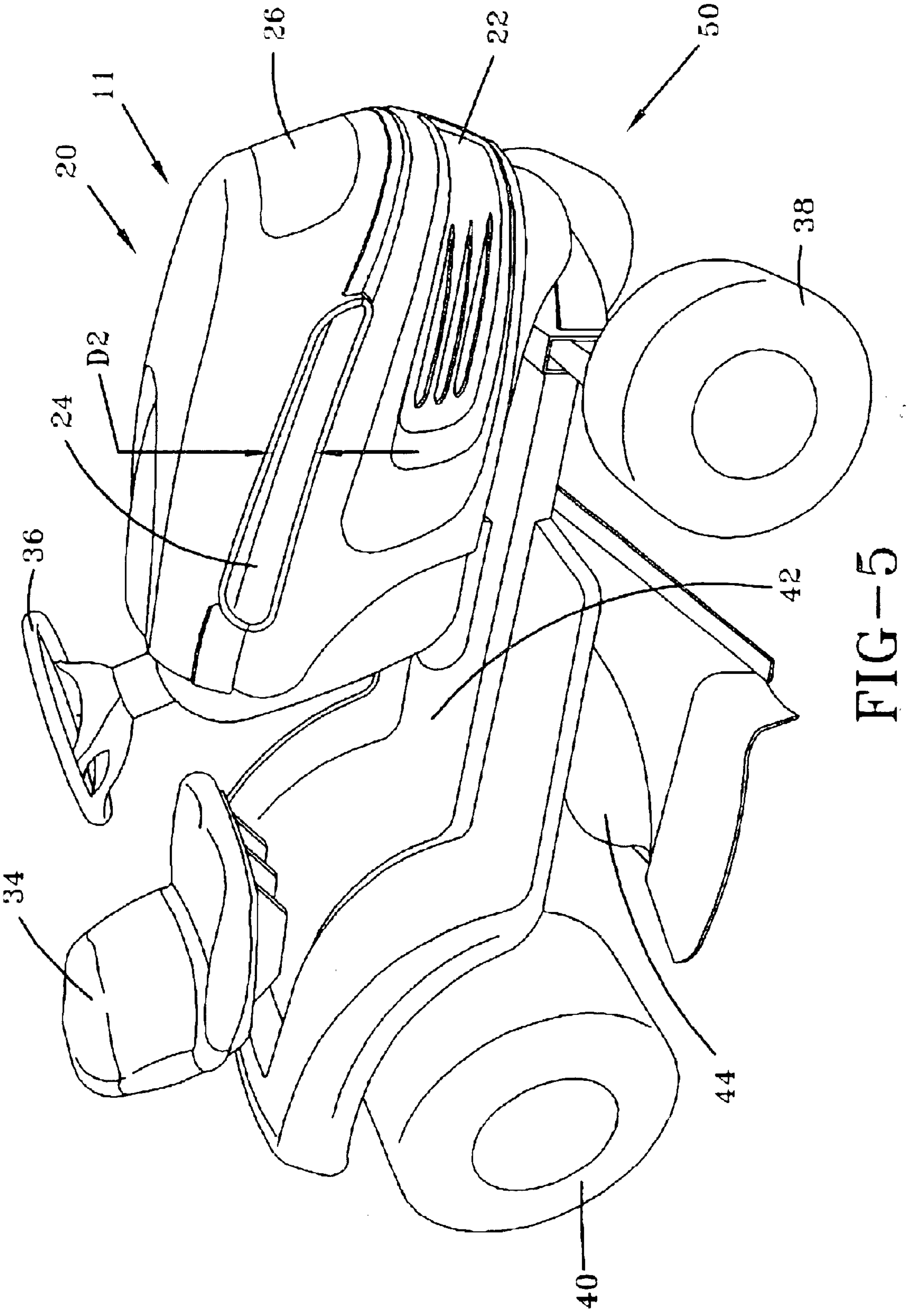
FIG. 5 is a perspective view of the inventive hood assembly on a riding lawn mower.

Referring now to the drawings, which are for purposes of illustrating a preferred embodiment of the invention only, and not for purposes of limiting the same, FIG. 5 shows a riding lawn mower 50, which incorporates an inventive mower hood 20 and hood/blower assembly 30 as shown in FIG. 3. The mower 50 has a steering wheel 36, a driver seat 34, blade housing 44, base 42, front wheels 38, and back wheels 40. The mower 50 also includes an engine 11, cutting blades (not shown), and a transmission (not shown). The operation of the mower 50 is well known in the art and will not be described herein.

Figure 1:
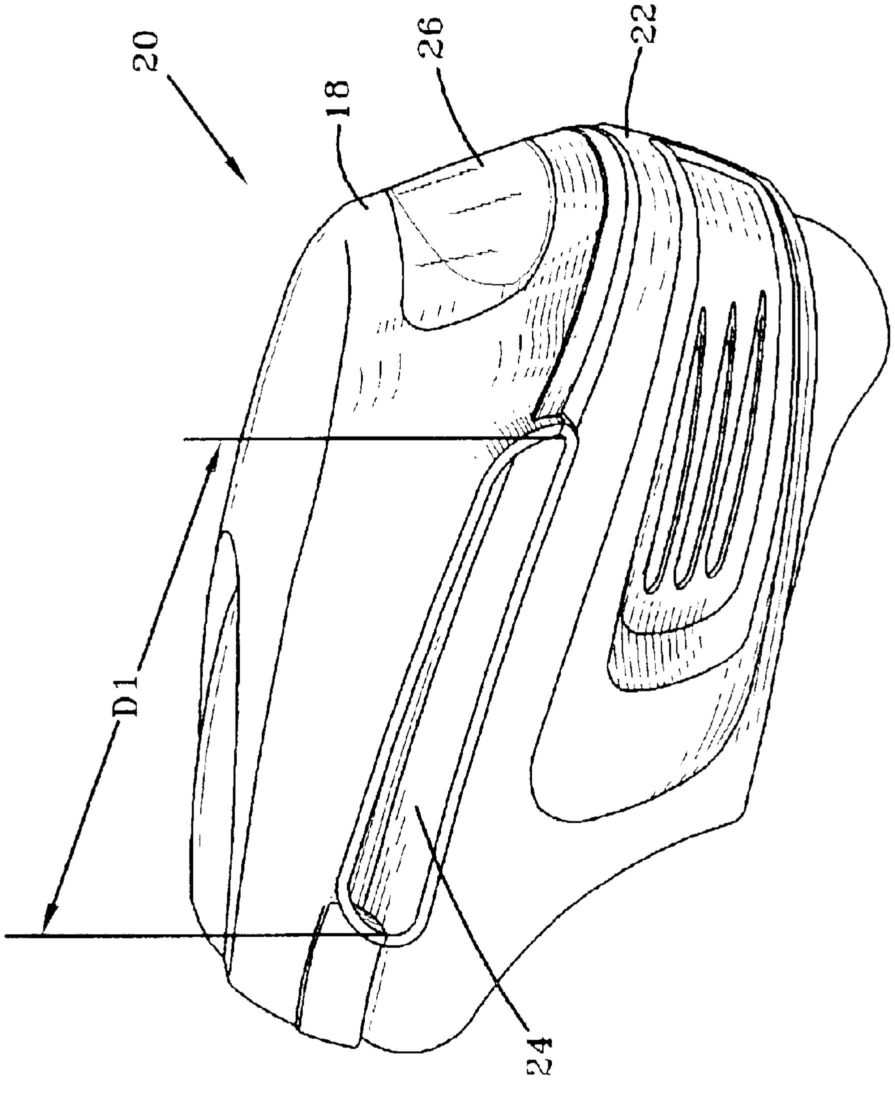
FIG. 1 is a side view of the inventive hood.
Figure 4:
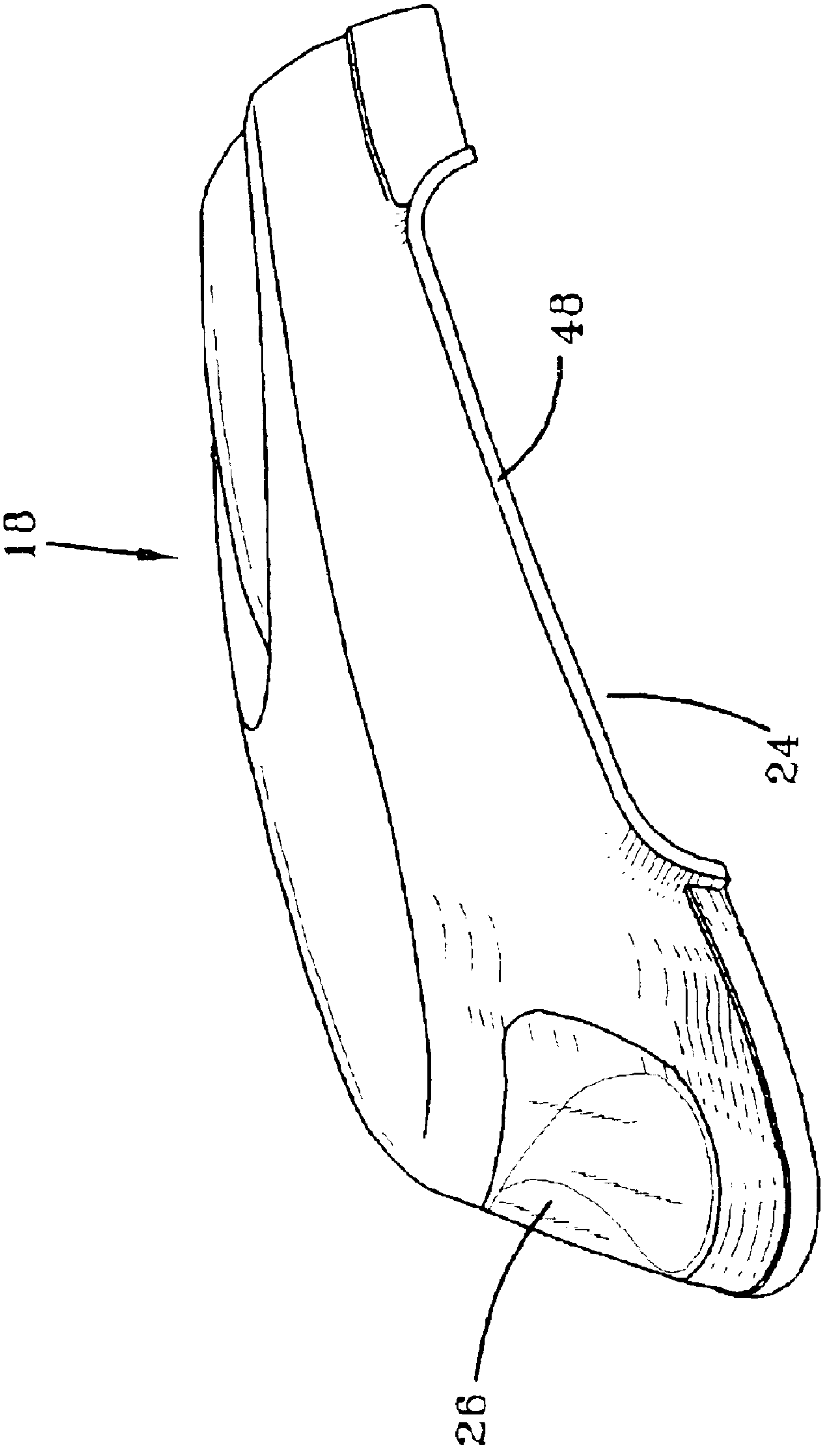
FIG. 4 is a side view of the upper hood.

FIG. 1 shows the inventive mower hood 20. The hood 20 has an upper hood 18 and a lower hood 22 as shown in FIG. 1. In the preferred embodiment the upper hood 18 is one continuous piece, by which is meant that the upper hood 18 has no openings. Upper hood 18 has a headlight 26 on the front portion of the upper hood 18. The upper hood 18 is fixedly connected to the lower hood 22 by any conventional connecting means chosen using sound engineering judgment. As can be seen in FIG. 1, an air induction cavity 24 horizontally spaced along the side (shown but not referenced) of the hood 20. In the preferred embodiment, opening D1 is substantially larger than opening D2, as shown in FIG. 5. As shown in FIGS. 1 and 5, the opening D1 is approximately eight times greater than the opening D2. However, the dimensions of D1 and D2 as shown only disclose the most preferred embodiment and are not intended to limit the invention in any way. The dimensions of D1 and D2 can be any dimensions chosen using sound engineering judgment, as long as the cavity 24 is spaced along the side of the hood 20. In the preferred embodiment, the current invention has two air induction cavities 24, one on each side of the hood 20, as shown in FIGS. 3 and 4. In the preferred embodiment, the air induction cavities 24 are aligned substantially parallel to each other on opposite sides of the hood 20. Also, in the preferred embodiment, the air induction cavities 24 are aligned on the sides (shown but not referenced) of the hood 20 such that the sides of the hood 20 are substantially identical in appearance. The alignment and spacing of the air induction cavities 24 in the preferred embodiment create a cross-draft suction effect so that the ambient air is drawn into the hood 20 more efficiently.

The invention does not require an air induction cavity 24 on each side of the hood 20. The invention will work with only one air induction cavity 24. The invention is also not limited to two air induction cavities 24. Any number of air induction cavities 24 may be used, as long as chosen using sound engineering judgment.

Figure 8:
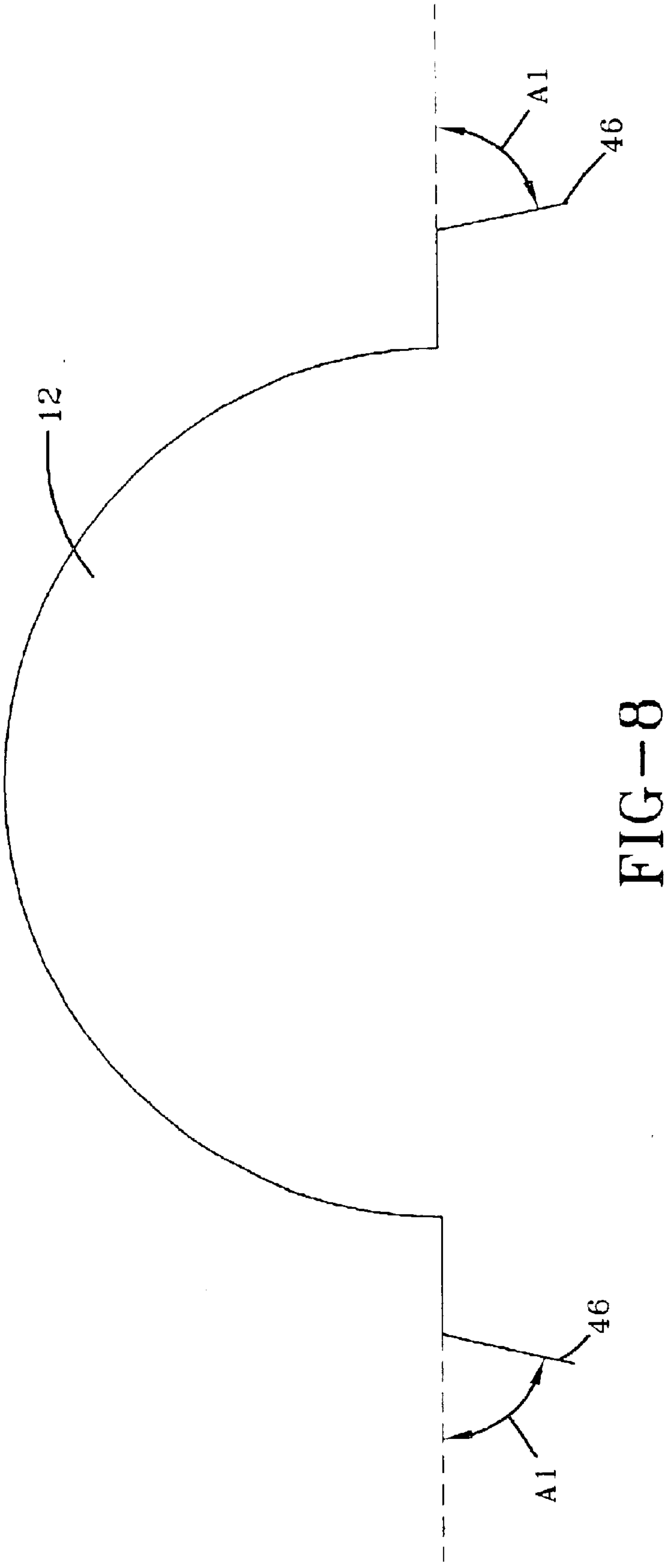
FIG. 8 is a front view of the blower housing, showing an angle A1 that the lower lip is angled at with respect to the blower housing; and, FIG. 9 is a perspective view of the blower housing, showing the height of the air intake and the height of the lower lip.

As shown in FIGS. 1–4, a blower housing 10 fits in the under side (shown but not referenced) of the upper hood 18. The blower housing 10 can be connected to the upper hood 18 by any conventional connecting means chosen using sound engineering judgment. Examples of the connecting means would be bolts, screws, snaps, welding, and the like. In the preferred embodiment, the blower housing 10 has a lower lip 46 on each side of the housing 10, a first shield member 12, a second shield member 14, and an air intake 16. The upper hood 18 and the blower housing 10 when connected together form the air induction cavity 24. More specifically, as shown in FIGS. 4 and 8, the upper hood 18 has an upper lip 48, which, in conjunction with lower lip 46 of the blower housing 10, forms the air induction cavity 24. In the preferred embodiment, the lower lip 46 is angled upwardly toward the air intake 16 so that there is a smooth draw of ambient air into the mower hood 20. The angling of the lower lip 46 allows for better aerodynamics of the induction cavities 24. The lower lip 46 and the blower housing 10 form an angle A1 as shown in FIG. 8. In the preferred embodiment this angle is between 60° and 80°. The angle A1 can be any angle chosen using sound engineering judgment, but an angle between 0° and 90° helps aid the flow of the ambient air into the air induction cavity 24.

The interconnection of the lips 46, 48 forms the air induction cavities 24, thereby eliminating the need to cut openings in the hood 20 to form the air induction cavities 24. The formation of the air induction cavity 24 by the connection of the upper and lower lips 46, 48 is only a preferred embodiment of the invention and is not intended to limit the invention in any way. The air induction cavity 24 could also be created by the connection of the upper hood 18 to the lower hood 22. The blower housing 10 could be eliminated all together and the lower hood 22 could have the lower lip 46, the shield members 12, 14, the air intake 16, and first and second channels 28, 32. The shield members 12, 14 are connected to the underside (not shown) of the upper hood 18, creating a seal. The shield members 12, 14 are connected to the upper hood 18 using any conventional connecting means, as long as chosen using sound engineering judgment. The connection of the shield members 12, 14 to the upper hood 18 prevents the mixing of the ambient air and the hot air from the engine 11. Thus, the shield members 12, 14 ensure that only the ambient air is drawn into the air intake 16. In the preferred embodiment, the blower housing 10 has a first channel 28 and a second channel 32. The channels 28, 32 improve the structural integrity of the blower housing 10. The channels 28, 32 allow the blower housing 10 to be more rigid, which prevents bending and stress on the blower housing 10. The channels 28, 32 are disclosed as part of the preferred embodiment and are not intended to limit the invention. The invention will work equally as well without the channels 28, 32.

Figure 6:
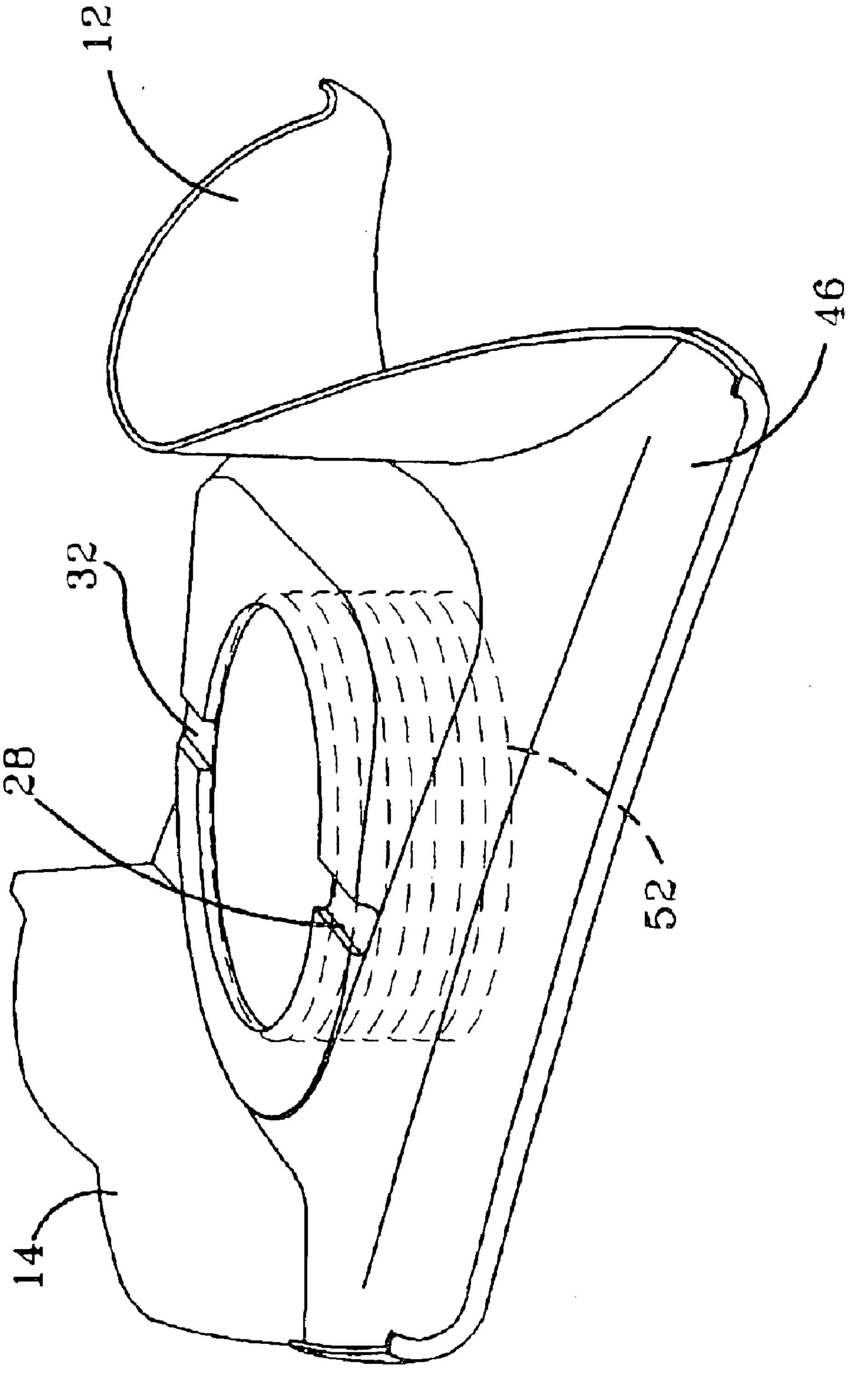
FIG. 6 is a perspective view of the inventive blower housing showing the bellows.
Figure 7:
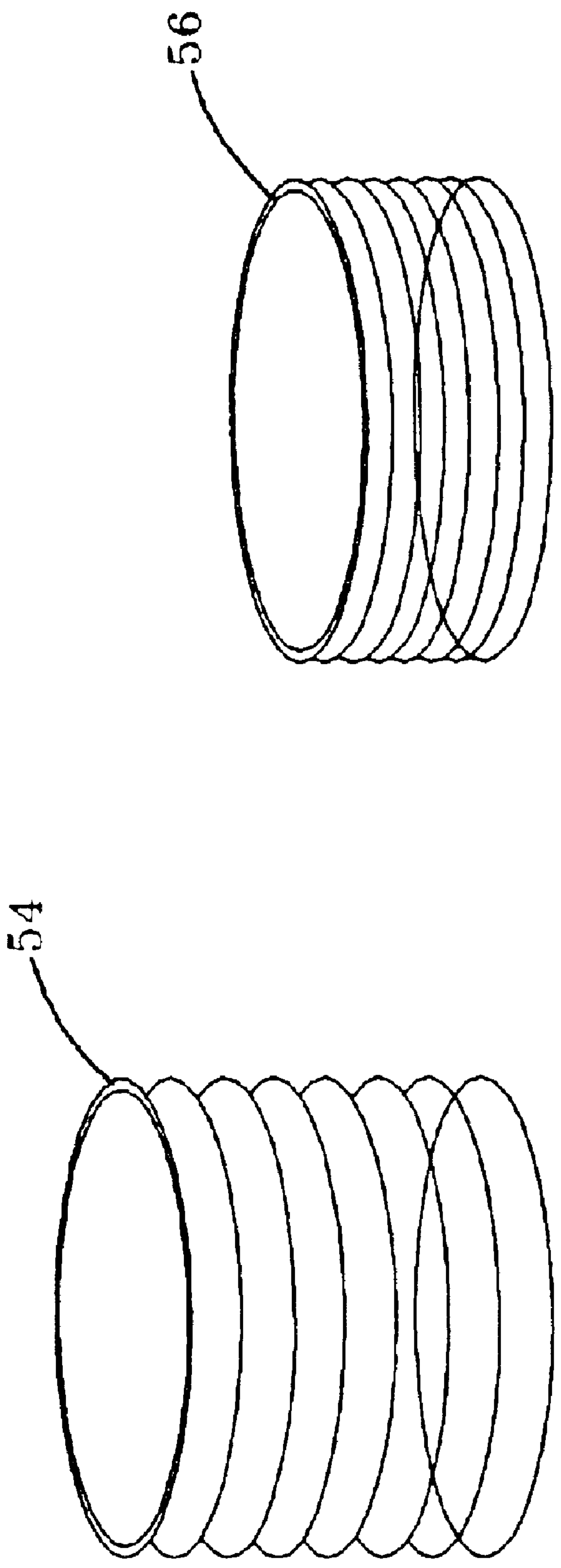
FIG. 7 is a side view of the bellows, showing both the contracted position and the expanded position.

FIG. 6 shows the blower housing 10 with a bellows 52. The bellows 52 is flexibly adjustable so that the hood 20 and blower housing 10 can be used on various size engines 11. The bellows 52 is adjusted up or down depending on the size of the engine 11 and the mower 50. As shown in FIG. 7, the bellows 52 acts in an accordion-like fashion. When a larger engine 11 is desired, the bellows 52 would allow the blower housing 10 to pushed closer to the upper hood 18 by assuming a contracted position 56. If a smaller engine 11 were used, the bellows 52 would be in an expanded position 54. The bellows 52 can be adjusted to any position between the contracted position 56 and the expanded position 54 in order to accommodate any size engine. The bellows 52 is fixedly connected to the blower housing 10 under the air intake 16. The bellows 52 also directs the ambient air directly to the engine 11. The bellows 52 can be connected using any conventional connecting means chosen using sound engineering judgment.

With reference now to FIG. 3, in the preferred embodiment, the hood/blower assembly 30 is made of a plastic material; however, the assembly 30 can be made of any material, chosen using sound engineering judgment, that is sturdy and heat-resistant enough to withstand the normal usage of the riding lawn mower 50. For example, the assembly can be made of metal, fiberglass, nylon, etc.

Figure 9:
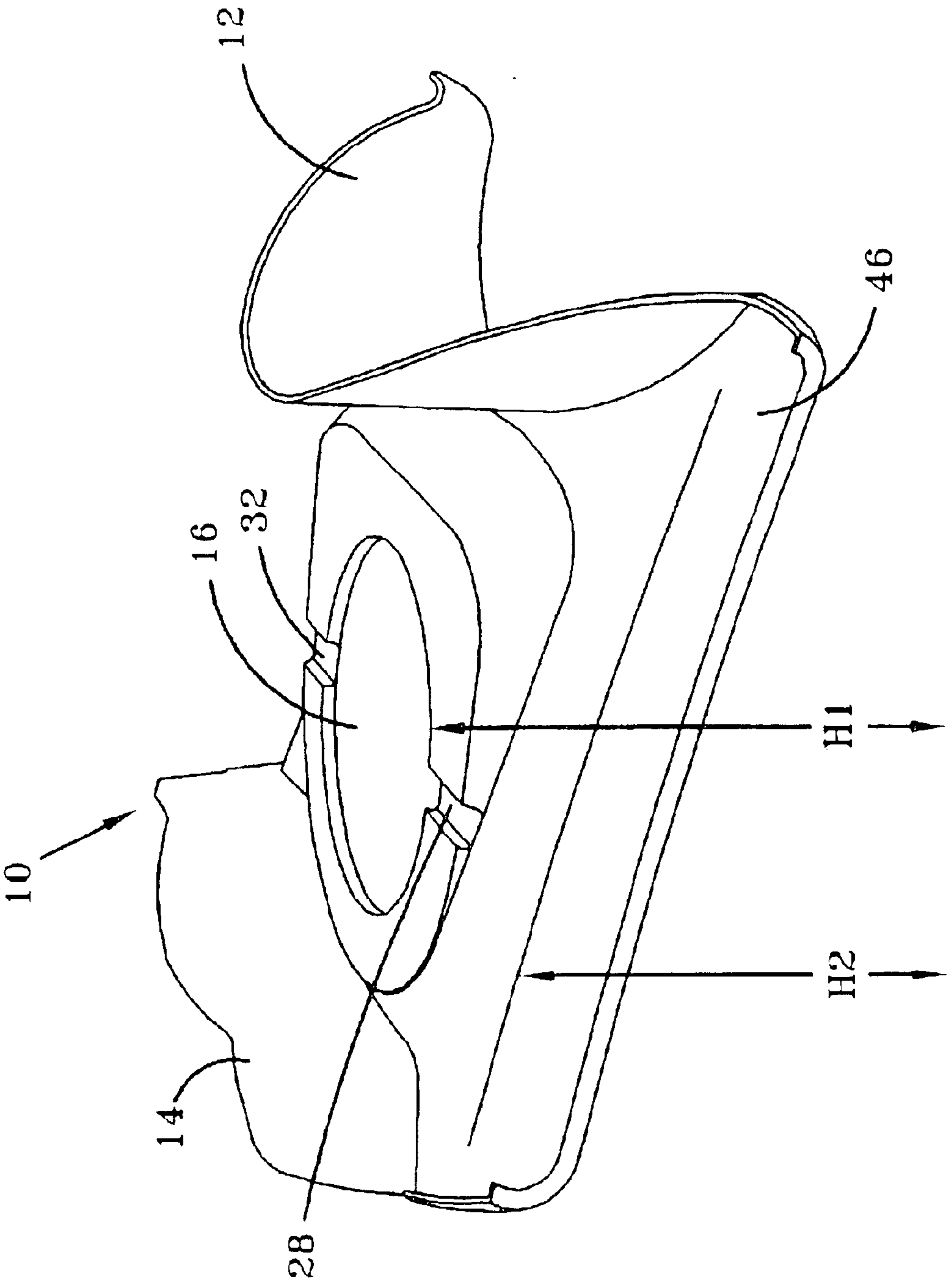

With reference now to FIG. 9, the air intake 16 has a height H1 and the lower lip 46 has a height H2. In the preferred embodiment the height H1 is greater than the height H2. The height H1 being greater than the height H2 helps prevent grass, leaves, and other debris from entering the engine 11.

Figure 2:
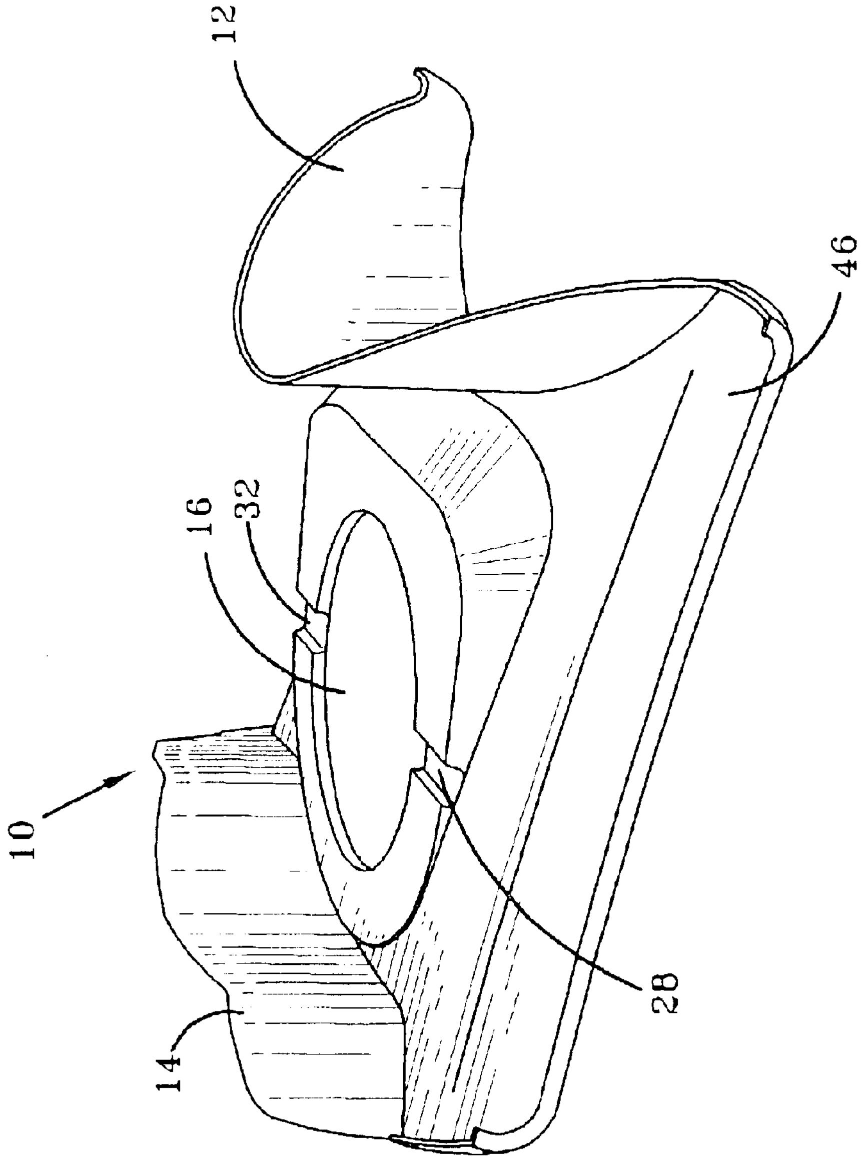
FIG. 2 is a perspective view of the inventive blower housing.

With reference now to the operation of the inventive air induction system, the ambient air is drawn in through the air induction cavities 24 into the air intake 16 and then into the engine 11. As is well known in the art, the operation of the mower engine 11 creates a vacuum thereby drawing air into the engine 11 through the air intake 16. However, a cooling fan (not shown) may also be used to drawn in the ambient air. The ambient air passes through the air induction cavity 24 over the lower lip 46 and into the air intake 16. In a preferred embodiment, the lower lip 46 of the air induction cavity 24 is lower than the air intake 16. This design prevents grass, leaves, and other debris (not shown) from entering into the engine 11. The lower lip 46 being lower than the air intake 16 creates a more circuitous route for any debris and creates more opportunities for the debris to be stopped short of the air intake 16. The shield members 12, 14, as shown in FIGS. 2 and 3, prevent the ambient air, which has been drawn in to the air induction cavity 24, from mixing with the hot air created by the engine 11. As is well known in the art, the ambient air is drawn into the engine in order to aid in combustion and to cool the engine 11.

The invention has been described with reference to the preferred embodiment. Obviously, modifications and alterations will occur to others upon a reading and understanding of the specification. It is intended by applicant to include all such modifications and alterations insofar as they come within the scope of the appended claims or the equivalents thereof.

Having thus described the invention, it is now claimed:

1. A hood/blower housing assembly for a tractor that forms an air induction cavity configured to introduce ambient air into associated engine of the tractor, the assembly comprising:

a hood defining an upper lip;

a blower housing operatively connected to the underside of the hood, the blower housing comprising:

a lower lip at a side periphery of the blower housing;

a air intake aperture leading to the associated engine;

a first shield member connected to the hood forward of the air intake aperture; and a second shield member connected to the hood aft of the air intake aperture;

wherein the lower lip of the blower housing and the upper lip of the hood respectively define lower and upper surfaces of an opening of the air induction cavity such that ambient air is brought into the assembly between the hood and the blower housing, wherein the first and second shields guide the introduced ambient air to the air intake aperture and prevent hot air from the engine from entering the air intake aperture.

2. The hood/blower housing assembly of claim 1, wherein the upper and lower lips have an upward sloping angle A1, the angle A1 being between 60° and 80°, the height of the air intake aperture being greater than the height of the lower lip.

3. The hood/blower housing assembly of claim 2 wherein the air induction cavity is a first cavity located on a first side of the tractor, the assembly further comprising a second air induction cavity on a second side of the tractor leading from a second opening in the hood to the air induction aperture.

4. The hood/blower housing assembly of claim 3 further comprising a bellows for adjustably attaching the blower housing to the associated engine.

5. The hood/blower housing assembly of claim 4, wherein the first and second air induction cavities comprise a first opening dimension D1 and a second opening dimension D2, wherein D1 is larger than D2.

6. The hood/blower housing assembly of claim 5, wherein D1 is at least eight times larger than D2.

7. The hood/blower housing assembly of claim 6 further comprising a headlight mounted in the hood.

8. The hood/blower housing assembly of claim 7 further comprising a first and second channel in the blower housing.

9. The hood/blower housing assembly of claim 1 wherein the upper lip is at the peripheral edge of the hood.

10. A hood/blower housing assembly for a tractor forming an air induction cavity configured to induce ambient air into an associated engine of the tractor, the assembly comprising:

a hood for enclosing the associated engine, the hood having an upper lip and a lower lip;

a blower housing operatively connected to the underside of the hood, the blower housing comprising:

an air intake aperture leading to the associated engine;

a first shield member connected to the hood forward of the air intake aperture; and a second shield member connected to the hood aft of the air intake aperture;

wherein the lower lip and the upper lip of the hood respectively define lower and upper surfaces of an opening leading to the air induction cavity such that ambient air is brought into the assembly between the hood and the blower housing, wherein the first and second shields guide the introduced air to the air intake aperture and prevent hot air from the engine from entering the air intake aperture.

11. The hood/blower housing assembly of claim 10, wherein the upper and lower lips have an upward sloping angle A1, the angle A1 being between 60° and 80°.

12. The hood/blower housing assembly of claim 11, wherein the height of the air intake aperture is greater than the height of the lower lip.

13. The hood/blower housing assembly of claim 12 wherein the air induction cavity is a first cavity located on a first side of the tractor, the assembly further comprising a second air induction cavity on a second side of the tractor.

14. The hood/blower housing assembly of claim 13 further comprising a bellows for adjustably attaching the blower housing to the associated engine.

15. The hood/blower housing assembly of claim 14, wherein the first and second air induction cavities comprise a first opening dimension D1 and a second opening dimension D2, wherein D1 is larger than D2.

16. The hood/blower housing assembly of claim 15, wherein D1 is at least eight times larger than D2.

17. The hood/blower housing assembly of claim 16 further comprising a headlight mounted in the upper hood.

18. The hood/blower housing assembly of claim 17 further comprising a first and second channel in the blower housing.

19. A method of air induction for a tractor wherein an associated engine creates suction to draw air into the associated engine, the method comprising the steps of:

providing a hood defining an upper lip;

providing a blower housing with an air intake aperture and a lower lip, the lower lip having a first height and the air intake aperture having a second height, the second height of the air intake aperture being greater than the first height of the lower lip;

connecting the hood to the blower housing, thereby creating an air induction cavity such that the lower lip and upper lip respectively define lower and upper surfaces of an opening of the air induction cavity;

drawing air into the blower housing through the air induction cavity such that ambient air is brought into the engine between the hood and the blower housing;

directing the air into the air intake aperture in the blower housing; and, preventing hot air from the associated engine from mixing with the air being drawn into the air intake aperture, the mixing being prevented by first and second shield members forming an airtight seal between the hood and the blower housing fore and aft of the air intake aperture such that the only path into the air intake aperture is through the air induction cavity.

20. The method of claim 19, wherein the step of providing the blower housing with the lower lip, comprises the step of providing the air induction cavity having a first opening dimension D1 and a second opening dimension D2, D1 being at least eight times greater than D2.

21. A hood assembly for a tractor that forms an air induction cavity configured to introduce ambient air into an associated engine of the tractor, the assembly comprising:

a hood having an inner surface and an outer surface;

a blower housing having an air intake aperture formed therein, the blower housing operatively connected with respect to at least a first portion of the inner surface of the hood member;

a connector having first and second ends, the first end forming a seal around the aperture in the blower housing and the second end configured to form a seal around an air intake aperture of the associated engine; and, wherein the first portion of the inner surface of the hood member and the blower housing and the connector form an air intake pathway leading from a plurality of openings in the hood to the second end of the connector for introducing ambient air into the engine such that heated air around the engine that is enclosed by a second portion of the inner surface of the hood is sealed from entering the air intake pathway.

22. The hood assembly of claim 21, wherein the blower housing comprises a first shield member connected to the hood forward of the air intake aperture and a second shield member connected to the hood aft of the air intake aperture.

23. The hood assembly of claim 21, wherein the connector is a flexibly extendible bellows for use in operatively sealingly connecting the air intake aperture with the associated air intakes of one of a plurality associated engines.

24. The hood assembly of claim 21, wherein openings in the hood comprise at least one opening on a first side of the tractor and a second opening on an opposite side of the tractor.

25. A hood assembly for a tractor that forms an air induction cavity configured to introduce an ambient air into an associated engine of the tractor, the assembly comprising:

a tractor hood having an inner surface, wherein a first portion of the inner surface of the hood partially encloses an engine cavity chamber of the tractor having a first air volume; and a blower housing assembly operatively sealingly connected with respect to at least a second portion of the inner surface of the hood, the blower housing having an air intake aperture formed therein and being operatively sealingly connected with respect to an associated air intake of an associated engine, wherein the at least a second portion of the inner surface of the hood and the blower housing assembly from outside the engine cavity to the air intake of the associated engine, wherein the first air volume is separated from the second air volume by the blower housing assembly.

26. The hood assembly of claim 25, wherein the blower housing assembly comprises a first shield member connected to the hood forward of the air intake aperture and a second shield member connected to the hood aft of the air intake aperture.

27. The hood assembly of claim 26, further comprising a bellows operatively sealingly juxtaposed between the blower housing and the associated air intake of the associated engine.

* * * * *

UNITED STATES PATENT AND TRADEMARK OFFICE

CERTIFICATE OF CORRECTION

PATENT NO. : 6,889,490 B2
APPLICATION NO. : 10/304604
DATED : May 10, 2005
INVENTOR(S) : Stefan Hornung It is certified that error appears in the above-identified patent and that said Letters Patent is hereby corrected as shown below:

In column 6, line 17, between “into” and “associated”, insert --an--

In column 6, line 23, delete “a” and substitute --an--

Signed and Sealed this

Twelfth Day of February, 2008

JON W. DUDAS
*Director of the United States Patent and Trademark Office*